July 1, 1969 W. W. DOLLISON 3,452,777
PRESSURE-RESPONSIVE SAFETY VALVE
Filed Aug. 24, 1964 Sheet 1 of 2
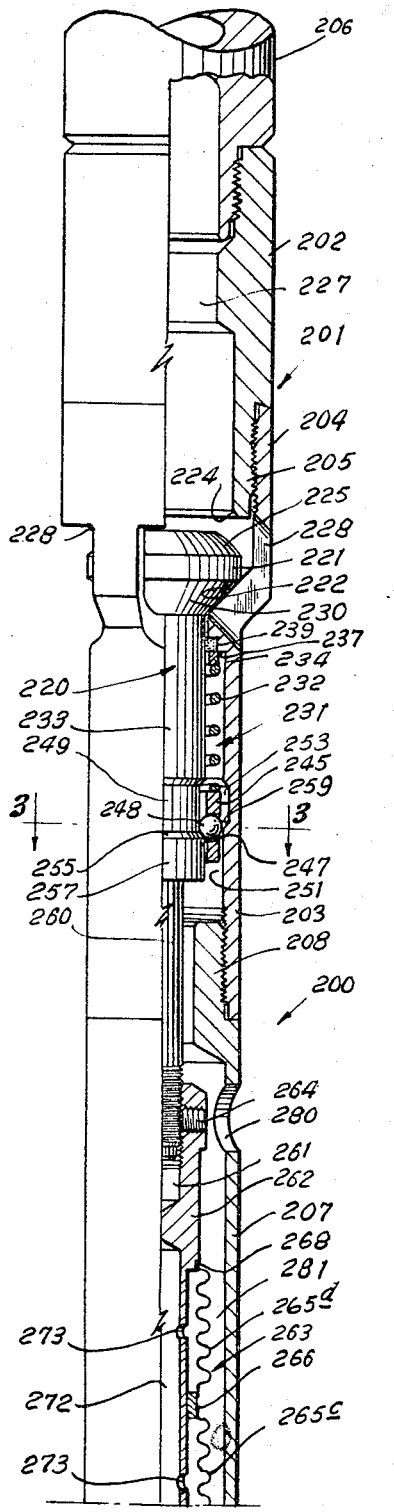
Fig. 1
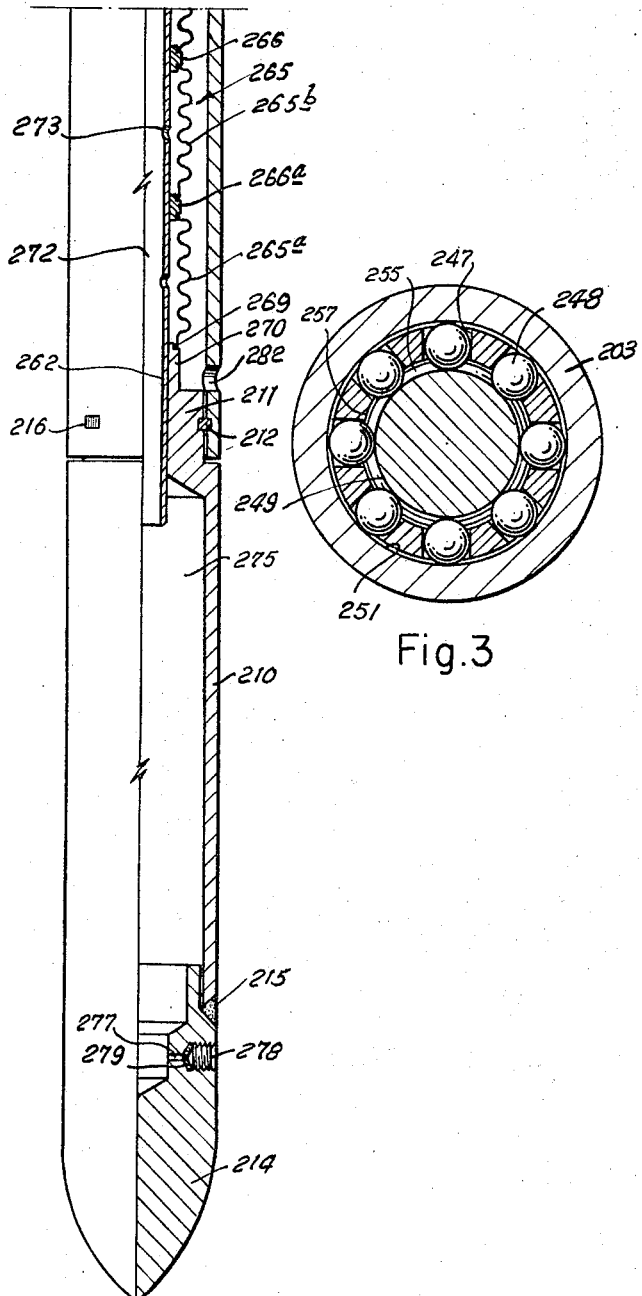
Fig. 2
Fig. 3
INVENTOR
William W. Dollison
BY Hastings Ashley
and
Walter J. Jaym
ATTORNEYS July 1, 1969

W. W. DOLLISON 3,452,777

PRESSURE-RESPONSIVE SAFETY VALVE

Filed Aug. 24, 1964

INVENTOR
William W. Dollison

BY

ATTORNEYS

United States Patent Office 3,452,777
Patented July 1, 1969

3,452,777
PRESSURE-RESPONSIVE SAFETY VALVE
William W. Dollison, 4441 Larchmont,
Dallas, Tex. 75201
Filed Aug. 24, 1964, Ser. No. 391,665
Int. Cl. F16k 17/02, 31/12, 15/06
U.S. Cl. 137—464                    19 Claims This invention relates to well tools and more particularly to flow control devices for controlling the flow of fluids through a flow conductor.

An object of this invention is to provide a new and improved flow control device having a housing providing a flow passage and valve means co-engageable with a seat surface of the housing for closing the flow passage, the co-engageable seat surfaces of the housing and the valve means providing a metal to metal seal when the valve is closed.

Another object is to provide a flow control device or safety valve whose closing is responsive to pressure exteriorly of the housing, and not to a pressure differential between the flow passage of the housing and the exterior of the housing.

Still another object is to provide a safety valve installable in a flow conductor, such as a string of tubing, the valve having a housing provided with a flow passage and a valve means for closing the flow passage, the valve having a detent mechanism which provides a biasing force tending to hold the valve means in open position until the valve means is moved a predetermined small distance from its open position towards its closed position by the force exerted on the valve means by a fluid pressure biased operator means, such as a bellows, whereby the valve closes with a snap action and flow cutting of the co-engageable seat surfaces of the valve means and the housing is minimized.

A further object is to provide a safety valve wherein the operator means includes a bellows biased by a charge of compressed gas towards its expanded position wherein the valve means is held in closed position and is biased by the pressure from the exterior of the housing towards its retracted position wherein the valve means is held in its open position.

A further object is to provide a safety valve having a relatively large volume charge chamber for the compressed gas whereby the pressure in the charge chamber does not decrease substantially due to the expansion of the volume of the charge chamber as the bellows moves to its expanded position.

A still further object is to provide a safety valve having a housing providing a flow passage opening to the exterior of the housing at longitudinally spaced locations, a valve means in the housing for closing the passage to flow of fluids through the passage between such locations, and a bellows assembly in the housing for moving the valve means to its closed position by the force exerted on the bellows by a charge of compressed gas in a charge chamber of the housing, the bellows assembly being exposed to the pressure from the exterior of the housing whose force exerted on the bellows assembly tends to hold the valve in its open position.

Another object is to provide a safety valve wherein the charge chamber is provided by a tubular bellows rod, an expansible bellows about the bellows rod and a valve member telescoped over the upper end portion of the bellows rod and movable longitudinally relative thereto, opposite ends of the bellows being connected to the bellows rod and the valve member.

Still another object is to provide a safety valve wherein the bellows assembly and the valve means are movable between a normal intermediate open position wherein the port to the exterior of the housing is of a normal orifice, an upper closed position and a lower open position wherein the opening provided by the port is relatively large to permit passage of solid substances through the port.

Additional objects and advantages of the invention will be readily apparent from the reading of the following description of a device constructed in accordance with the invention, and reference to the accompanying drawings thereof, wherein:

FIGURE 1 is a vertical, partly sectional view of the upper portions of a valve embodying the invention;

FIGURE 2 is a view similar to FIGURE 1, being a continuation thereof, and showing the lower portions of the valve;

FIGURE 3 is a view taken on line 3—3 of FIGURE 1;

Figure 4:
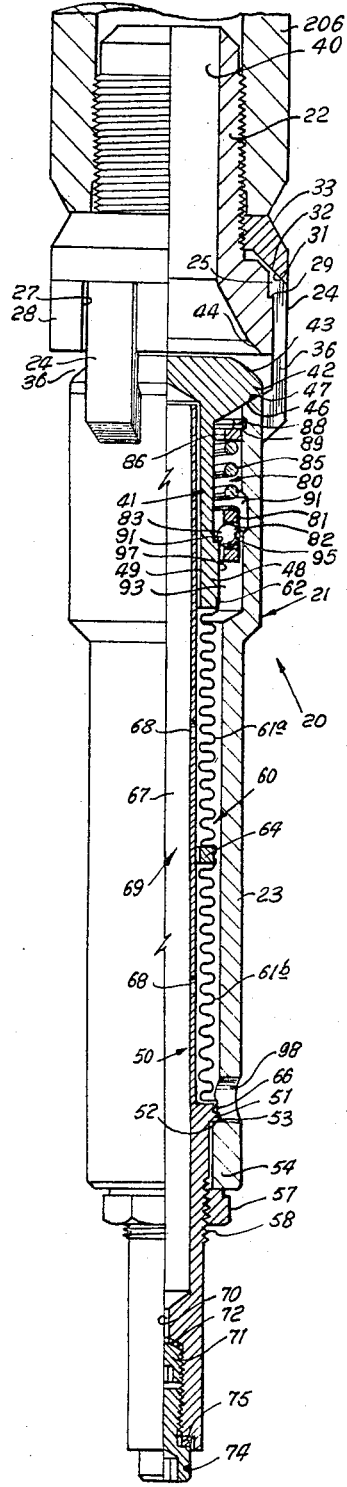
FIGURE 4 is a vertical, partly sectional view of a modified form of the valve embodying the invention.

Referring now particularly to FIGURES 1, 2 and 3 of the drawings, the valve 200 embodying the invention includes a housing 201 having a top section 202 by means of which the housing is connectable to a suitable locking mandrel 206, such as the Otis Type S Locking Mandrel illustrated and described on page 3663 of the Composite Catalog of Oil Field Equipment and Service, 1963–64 edition, and also in the patent to I. A. Miller, No. 2,673,614. The housing also includes a port section 203 whose upper enlarged end portion 204 is threaded on the reduced lower end portion 205 of the top section, a bellows section 207 whose upper reduced end portion 208 is threaded in the lower end of the port section, a chamber section 210 whose upper reduced portion 211 telescopes into the lower end of the bellows section and is releasably secured thereto by a locking wire 212, and a bottom section 214 which closes the lower end of the charge chamber section 210 and is secured thereto in any suitable manner, as by a weld 215. The lock wire 212 is received in aligned external and internal annular recesses of the reduced end portion 211 of the chamber section and the bellows section 207 and is insertable thereinto through a suitable slot 216 of the bellows section which opens to its internal annular recess.

A valve 220 has an enlarged head 221 disposed between the inwardly and upwardly extending annular shoulder 222 of the port section 203 and an arcuate annular seat surface or shoulder 224 of the top housing section 202. The valve head has an arcuate annular top seat surface 225 which is engageable with the arcuate seat surface 224 when the valve is moved to its upper position to provide a metal to metal seal therebetween and close the longitudinal passage 227 of the top section. The port section is provided with a plurality of longitudinal slots 228 through which fluids may flow from the exterior of the housing into the lower end of the passage 227 when the valve 220 is in its lower position illustrated in FIGURE 14. The valve also has a lower inwardly and downwardly extending annular stop shoulder or surface 230 which engages the internal stop shoulder 222 of the port housing section to limit its downward movement in the housing.

The valve, when in its open position, is biased downwardly by a detent mechanism 231 which included a biasing spring 232 disposed about the dependent valve rod 233, which extends downwardly from the head. The upper end of the spring bears against a spacer ring 234 whose upward movement in the port housing section is limited by the engagement of its top surface with the downwardly facing internal annular shoulder 237 of the port housing section below its ports 228. A felt wiper 239 is disposed in a suitable internal recess of the port housing section to wipe from the valve rod 233 any material which may be clinging thereto as the valve rod moves longitudinally in the housing between its open and closed positions. The bottom end of the spring bears against a latch ball retainer ring 245 movably disposed between the valve rod and the port housing section. The retainer ring has a plurality of radial apertures 247 in which latch balls 248 are movably disposed. When the valve is in its lower open position, the inner portions of the latch balls extend into the external annular recess 249 of the valve rod and the latch balls are held in such inner positions by the engagement of their outer portions with the internal stop surface 251 of the port housing section below its internal annular recess 253. The annular shoulder 255 defining the lower side of the valve rod recess 249 extends downwardly and outwardly and is engaged by the inner portions of the latch balls which thus transmit the downward force of the spring to the valve rod. Once the latch balls have been moved upwardly to a position wherein the latch balls are in alignment with the internal recess of the port housing section, the camming engagement of the shoulder 255 with the latch balls moves the latch balls outwardly into the internal recess 253 and out of engagement with the shoulder 255. When the valve rod is thus freed of the biasing force of the spring, its upward movement is accelerated if an upward force is being exerted thereon.

When the valve is in its upper closed position, the inner portions of the latch balls are engaged by the external lock surface 257 of the piston rod below the shoulder 255 and the latch balls are thus held against inward movement. The internal annular shoulder 259 defining the lower side of the annular internal recess 253 extends inwardly and downwardly and the camming engagement of this shoulder with the outer portions of the latch balls caused the latch balls to be moved inwardly into the internal recess 249 of the valve rod, due to the force exerted on the latch balls by the spring 232, when the valve is moved downwardly toward its open position and the valve rod is moved downwardly towards its lower position and the external recess 249 moves into alignment with the latch balls.

The valve rod has a reduced dependent portion 260 threaded in the upwardly opening bore 261 of the bellows support and guide rod 262 of the bellows assembly 263. The piston rod may be secured in any adjusted position relative to the bellows rod by a suitable set screw 264. A bellows 265 is disposed about the bellows rod 262 and includes a plurality of sections 265a, 265b, 265c and 265d which are connected by slidable guide connector rings 266a, 266b and 266c. The top end portion of the topmost bellows section 265d telescopes over an annular shoulder 268 of the bellows rod and is secured thereto in seal tight relationship in any suitable manner, as by soldering or welding. The bottom end portion of the lowermost bellows section 265a extends over an annular shoulder 269 of the annular top extension 270 of the chamber housing section 210 and is secured thereto in seal tight relationship.

The piston rod has a downwardly opening bore or passage 272 and a plurality of lateral ports or apertures 273 which open to the interior of the bellows. The passage 272 opens into the charge chamber 275 provided by the chamber and bottom housing section 210 and 214. Gas under pressure is introducible into the chamber through a filler port 277 of the bottom housing section which is closable by a plug 278 and a gasket 279. The bellows housing section is provided with one or more large ports 280 through which pressure from the exterior of the housing is communicated to the upper end of an outer chamber 281 between the bellows and the chamber housing section. A drain and tool aperture 282 is provided in the chamber housing section at its lower end.

A suitable tool may be inserted in the aperture 282 to facilitate assembly and disassembly of the housing.

The locking mandrel 206 by means of which the valve 200 is to be locked in the flow conductor or string of tubing is secured to the top housing section 202 and is lowerable through a flow conductor; such as a string of tubing, by means of a suitable running tool, such as the Otis Type T running tool, described and illustrated on page 3644 of the Composite Catalog of Oil Field Equipment and Service, 1963–64 edition, which is releasably secured to the locking mandrel. The locking mandrel and the safety valve are lowered into the string of tubing by means of the running tool and a suitable flexible member or line connected to the running tool until the locking mandrel is located in a suitable landing nipple connected in the string of tubing. The running tool is then operated in the usual manner to set the locking means of the locking mandrel and lock it in the landing nipple. The locking mandrel has an external seal means which engages a suitable seal surface of the landing nipple to close the annulus between the locking mandrel and the tubing above the safety valve. The running tool is then released from the locking mandrel and removed from the well.

The pressure in the well at the location at which the safety valve is installed is in ordinary practice much higher than the pressure at which the valve will close since the well is shut in during the installation of the locking mandrel and the safety valve in the tubing and the valve is therefore in its open position. The relatively high pressure from the exterior of the valve communicated to the annular outer chamber 281 and the exterior of the bellows through the ports 280 and the force of the spring 232 holds the valve in its open position. The well fluids flow through the slots or ports 228 into the passage 227 and then upwardly through the passage of the locking mandrel to the string of tubing above the locking mandrel and thence to the surface. If the pressure of the well fluids at the safety valve now drops below a value predetermined by the pressure of the charge of gas in the chamber 275 and therefore within the bellows 265, the force of the charge of gas exerted on the bellows is then effective to move the bellows rod upwardly against the force exerted thereon by the spring 232 of the detent assembly 231. When the valve has moved upwardly a short predetermined distance, the latch balls 248 of the detent assembly move into alignment with the internal recess 253 and are immediately cammed thereinto due to their engagement with the shoulder 255 of the valve rod 233. The spring 232 is now rendered ineffective and no longer tends to resist upward movement of the valve. The valve is now moved upwardly to its closed position with a snap action by the force exerted by the charge of compressed gas. In the closed position of the valve, the seats 224 and 225 of the housing and the valve provide a metal to metal seal and prevent upward flow of fluids through the passage 227.

Once the valve 220 has moved to its upper closed position, it will not move downwardly to its open position even if the pressure exteriorly of the valve again rises to the value at which it closed since the spring 232 now does not exert any downward force on the valve. In addition, an upwardly acting pressure differential now exists across the valve since, upon its closing, the pressure thereabove immediately begins to decline while the pressure therebelow begins to increase. After the valve has closed it can be opened only by increasing the pressure in the tubing above the locking mandrel until such pressure acting downwardly on the upper end of the valve head 221 above the seat 224 exceeds the force acting upwardly on the valve head from below. As the valve moves downwardly from its closed position, the internal recess 249 of the valve rod moves into alignment with the latch balls and the shoulder 257 moves below the latch balls, the balls being held in such position by their engagement with the internal stop surface 251. As it does so, the latch balls are cammed inwardly, due to their camming engagement with the lower shoulder 259, into the recess 249 whereupon the spring 232 again exerts a biasing force downwardly on the valve rod due to the engagement of the latch balls with the shoulder 255 of the valve rod.

It will now be seen that the safety valve 200 has a housing and a valve movably mounted in the housing for closing the flow passage which provide a metal to metal seal at all seating or sealing surfaces.

It will further be seen that the valve is provided with a detent means, such as the latch ball detent assembly 231 for holding the valve in its open position and that the detent means is rendered ineffective upon a predetermined movement of the valve towards its closed upper position whereby a snap closing action of the valve is obtained.

It will further be seen that the valve is moved toward its closed position by means responsive only to the pressure exteriorly of the valve housing and that such pressure responsive means includes a bellows and a charge of compressed gas whose force is exerted on the bellows tending to move the valve toward its upper closed position.

It will further be seen that the charge chamber 275 is of relatively large volume and that the hollow bellows rod 262 further increases the volume of the compressed gas in the charge chamber so that there is relatively small pressure variation in the charge chamber as the valve is moved between its open and closed position and the bellows expand and contract. The force with which the valve 220 is held in its closed position is therefore substantially equal to the force with which it is biased upwardly by the charge of gas when in its open position since the degree of expansion of the volume of the charge chamber as the valve moves to its closed position, and therefore the decrease in the pressure of the charge of gas in the chamber, is relatively small due to the initial large volume of the charge of gas.

Referring now to FIGURE 4 of the drawing, the modified form of the safety valve 20 embodying the invention, which is of somewhat simpler and more economical construction than the safety valve 200 illustrated in FIGURES 1 through 3 of the drawings, includes a housing 21 having a top section 22 and a bottom section 23. The two housing sections are releasably secured to one another by means of a plurality of circumferentially spaced resilient collet fingers 24 whose lower ends are integral with, or rigidly secured to, the bottom housing section and whose upper ends are provided with inwardly extending bosses or hooks 25. The upper end portions of the collet fingers are receivable in the circumferentially spaced longitudinal slots 27 of the external annular flange 28 at the lower end of the top housing section and their hooks engage an upwardly facing shoulder 29 of the top housing section intermediate the ends of the slots to limit downward movement of the collet fingers relative to the top housing section. The upper ends of the collet fingers are movable resiliently outwardly to permit downward movement of the flange 28 therebetween.

The collet fingers are secured against outward displacement by a nut 30 threaded on the top housing section whose bottom downwardly and outwardly inclined shoulder 31 is engageable with the top downwardly and outwardly extending or beveled end shoulders or surfaces 32 of the collet fingers. It will be apparent that as the nut 30 is screwed downwardly on the top housing section, the camming engagement between the shoulder 31 and the shoulders 32 of the collet fingers will tend to force and hold the upper ends of the collet fingers in the slots 27 and against outward and upward movement relative to the top housing section. The collet fingers are held against lateral displacement in the slots 27 by the engagement of their side surfaces with the longtudinal spaced surfaces defining the slots.

The slots or longtudinal flow passages 36 between adjacent collet fingers and the two housing sections permit fluid flow between the longitudinal passage 40 of the top housing section and the exterior of the housing when a valve member 41 longitudinally movable mounted in the housing is in the lower position illustrated in FIGURE 4. The valve member 41 has an enlarged head 42 whose upwardly facing annular arcuate surface 43 is engageable with the downwardly facing annular arcuate seat surface 44 of the top housing section to close the lower end of the flow passage 40 when the valve member is in its uppermost position in the housing. Downward movement of the valve member is limited by the engagement of the lower annular shoulder or surface 46 of its head with the upwardly facing annular shoulder 47 of the bottom housing section.

The dependent stem 48 of the valve member has a downwardly opening longitudinal passage or bore 49 into which telescopes the upper end portion of the tubular bellows rod 50. The bellows rod intermediate its ends is provided with an external annular flange 51 whose annular bottom shoulder 52 is engageable with the upwardly facing annular shoulder 53 of the internal annular flange 54 at the lower end of the bottom housing section 23. The bellows rod extends downwardly of the lower end of the bottom housing section and is releasably secured against upward movement relative thereto by a nut 57 on the intermediate threaded portion 58 of the bellows rod.

A bellows 60 is disposed in the bottom housing section about the bellows rod and includes top and bottom bellows sections 61a and 61b. The bellows sections 61a and 61b are of the usual resilient metal corrugated type. The top annular end flange or portion of the top bellows section telescopes over an annular shoulder 62 at the lower end of the valve stem 48 and is rigidly secured thereto in seal tight relationship by welding or soldering. The bottom annular end flange of the top bellows section telescopes, over, and is secured in seal tight relationship to, a connector ring 64. The top end flange or portion of the btotom bellows section similarly telescopes over and is secured to the connector ring 64 and its bottom end annular flange telscopes over a shoulder 66 of the bellows rod and is rigidly secured thereto in seal tight relationship. The bellows rod is tubular and its bore 67 is provided with a plurality of lateral ports 68 which communicate with the interior of the bellows 60. The bore 67 of the bellows rod, the downwardly facing bore 49 of the valve member, and the bellows form a gas charge chamber 69 into which a charge of gas under pressure may be introduced through a filler port 70 in the lower end of the bellows rod. The filler port is closable by a suitable closure plug 71 threaded in the lower enlarged portion of the filler port and a gasket 72. A protective plug 74 is threaded in the lower enlarged portion of the filler port to protect the plug 71. A suitable gasket 75 may be disposed in an internal downwardly facing recess of the bellows rod and interposed between the upwardly facing shoulder of the external enlarged head of the protector plug and a downwardly facing shoulder of the bellows rod defining the upper end of the recess.

A detent assembly 80 similar to the detent assembly 231 of the valve 200 is disposed in the uuper enlarged portion of the longitudinal bore of the lower housing section and includes a latch ball retainer ring 81 having a plurality of circumferentially spaced apertures 82 in which are movably disposed latch balls 83. The retainer ring is biased downwardly by a spring 85 whose lower end engages the annular upper end surface of the retainer ring and whose upper end engages a stop ring 86 held against upward movement by a split lock ring 88 whose outer portions are received in a suitable internal annular recess 89 of the bottom housing section.

When the valve member is in its lowermost open position illustrated in FIGURE 4, the inner portions of the latch balls engage the downwardly and outwardly inclined cam shoulder 91 of the valve member while the outer portions engage the internal stop surface 3 of the bottom housing section below the internal annular recess 95 thereof. It will be apparent that when the detent assembly is in the position illustrated in FIGURE 4, the force of the spring 85 is effective to bias the valve member downwardly and against upward movement from its open position. When the valve member moves a predetermined distance from its open position, the outer portions of the latch balls move into alignment with the internal recess 95 and above the internal annular shoulder 96 and are cammed outwardly into the recess 95 due to the camming engagement of the shoulder 91 with the latch balls. When the latch balls are cammed outwardly into the internal recess and out of the engagement with the shoulder 91, the spring no longer is effective to bias the valve member downwardly and the latch balls are then held in the rceess 95 due to the engagement of their inner portions with the external stop surface 97 of the valve member below its shoulder 91.

When the valve member moves downward from its fully closed position towards its open position and the stop surface 97 moves out of engagement with the latch balls, the latch balls are moved into engagement with the shoulder 91 due to the camming engagement of their outer portions with the annuluar downwardly and inwardly inclined or beveled shoulder 96 of the bottom housing section defining the lower end of the internal recess 95.

It will be apparent that the valve 20 is installable in a flow conductor by means of a locking mandrel 206 and a running tool in the same manner as the valve 200 and will function in the same manner to prevent fluid flow between the exterior of the valve through the port 36 and the flow passage 40 of the top housing section 22 and thence through the locking mandrel to the tubing string above the locking mandrel when the pressure exteriorly of the valve housing decreases below a predetermined value predetermined by the pressure of the charge of gas within the charge chamber 69.

It will further be seen that the valve closes with a snap action once it has been moved a predetermined short distance from its fully open position towards its closed position.

Figure 5:
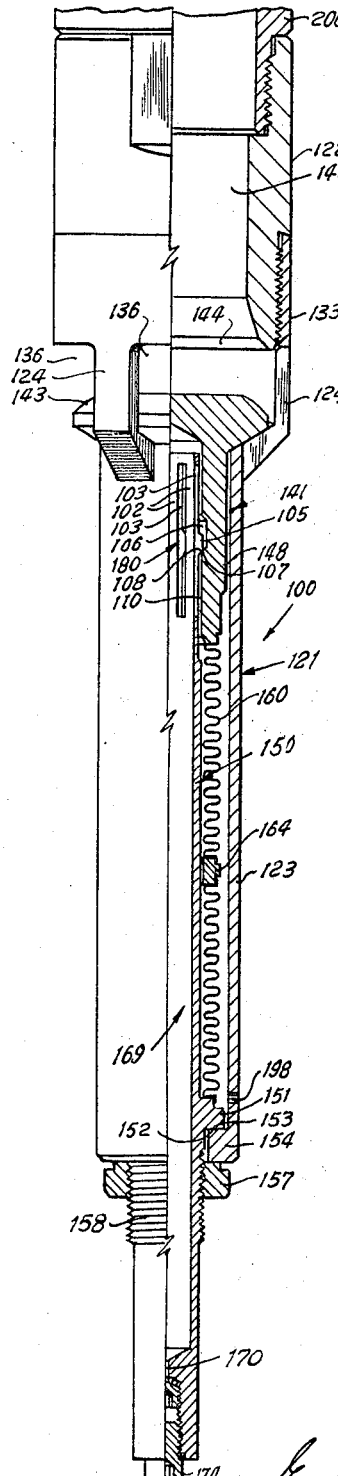
FIGURE 5 is a vertical, partly sectional view of another modified form of the valve embodying the invention; and, FIGURE 6 is a vertical, partly sectional view, with some parts broken away of still another modified form of the valve embodying the invention.

The safety valve 100 illustrated in FIGURE 5 is substantially similar to the valve 20 and accordingly its elements have been provided with the same reference numerals to which the prefix "1" has been added, as the corresponding elements of the valve 20. The top housing section 122 of the safety valve is threaded in the upper enlarged annular portion of the lower housing section 123. The upper enlarged cylindrical portion 133 of the bottom housing section has longitudinal slots 136 defined by the fingers 124. The detent assembly or means 180 of the valve 100 which releasably holds the valve member 141 against upward movement from its lower open position towards its upper closed position comprises a plurality of resilient collet strips 102, formed by longitudinal slots 103 in the upper end portion of the bellows rod 150, whose external bosses 105 located intermediate the ends of the collet strips are receivable in an internal annular recess 106 of the stem 148 of the valve member. The bosses 105 have lower upwardly and outwardly inclined cam shoulders 107 which engage the similarly upwardly and outwardly inclined annular internal shoulder 108 of the stem defining the lower end of the internal recess 106 whereby when a predetermined upward force is exerted on the valve member, the collet strips are flexed inwardly and permit the bosses to move out of the recess 106 and the valve member is released to move upwardly to its closed position wherein its annular arcuate seat shoulder or surface 143 engages the seat surface 144 of the top housing section. The nut 157 threaded on the bellows rod may be in the form of a conical cap.

It will now be apparent that the valve 100 is installable in a flow conductor in the same manner as the valves 200 and 20 and that the valve moves to its closed position when the pressure exteriorly of the valve which is communicated to the exterior of the bellows through the ports 198 of the bottom housing section falls to such a degree that the force of the pressure of the charge of gas in the charge chamber 169 tending to move the valve member upwardly exceeds the resilient force of the collet strips. Once the valve member 141 moves to the position wherein the bosses of the collet strips move out of engagement with the shoulder 108, the force with which the collet strip tend to hold the valve member against upward movement is decreased substantially and the valve member moves rapidly with a snap action to its closed position. Once the valve member has moved to its upper closed position, it will remain in closed position until the pressure within the passage 140 of the top housing section 122 is raised to a value exceeding the pressure of the charge of gas within the charge chamber 169 at which its force tending to move the valve member downwardly exceeds the upward force of the charge of gas and the friction force between the bosses and the internal surface 110 of the stem. As the valve member reaches its lowermost open position, the bosses 105 again move outwardly into the internal recess 106 of the valve member.

The valve 100a is also similar to the valve 20 and the valve 100 and, accordingly, its elements have been provided with the same reference numerals as those of the valve 20 of FIGURE 4, having the prefix "1" added to some of which the subscript "a" has been added as corresponding to the elements of the valve 100. The housing 121a of the valve 100a includes a bottom housing section 122a by the collet fingers 124a and a nut 130 threaded on the top housing section 122a. The collet fingers extend into the slots 127 in the external annular flange 128 of the top housing section 122a and are provided with hooks 125 which engage the upwardly facing shoulders 129 of the top housing section. The engagement with the downwardly and outwardly extending annular shoulder 131 of the nut 130 with the similarly downwardly and outwardly inclined top end shoulders 132 of the collet fingers 124a holds the collet fingers against upward and outward movement and thus holds the two housing sections against movement relative to one another.

Figure 6:
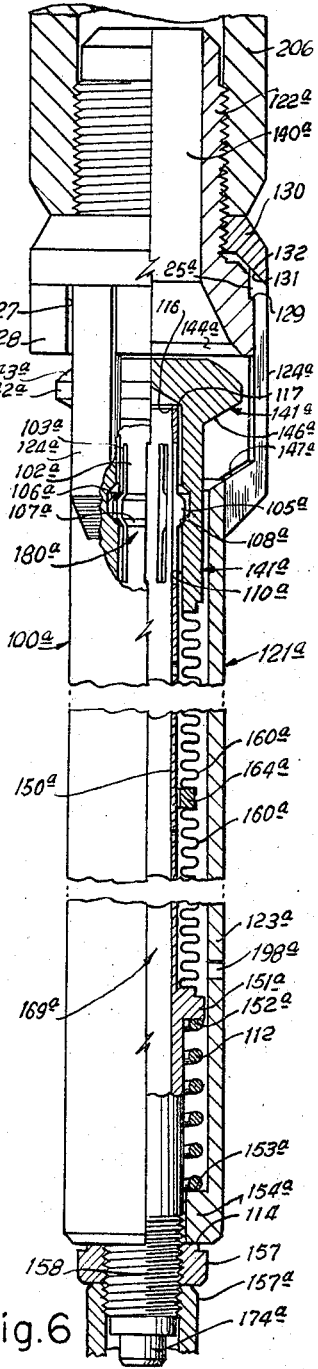

The valve rod 150a is biased to its upper position illustrated in FIGURE 6 by a spring 112 whose upper end engages the annular bottom shoulder or surface 152a of the external annular flange 151a and its lower bottom end portion engages the annular shoulder 153a of the internal flange 154a at the lower end of the bottom housing section 123a. Upward movement of the bellows rod is limited by the engagement of the annular upper end shoulder 114 of the nut or conical cap 157 with the bottom end surface of the bottom housing section. The charge chamber 169a of the valve 100a is filled through a filler port in the lower end of the bellows rod which is closable in the same manner as the filler ports 70 and 170, and a lock cap 157a, which may be conical, locks the nut 157 against movement on the threads 158 on the lower portion of the bellows rod.

In use, the valve 100a is installable in a flow conductor such as a string of tubing by means of a locking mandrel 206 connected to the top housing section and is lowerable therewith in the tubing by a suitable running tool which is releasable from the locking mandrel when the locking mandrel is locked in a suitable landing nipple connected in the string of tubing. The valve is held in its normal open position illustrated in FIGURE 6 during normal operations as long as the pressure exteriorly of the tubing, which is communicated to the exterior of the bellows 160a through the slots or passage 136a and also through the ports 198a, does not decrease below a predetermined value. When the pressure exteriorly drops below this predetermined value at which the force of the charge of gas in the chamber 169 is effective to move the valve member 141a upwardly against the resistance being offered by the detent mechanism 180a, the valve member 141a moves upwardly relative to the bellows rod 150a which is now held against upward movement by the engagement of the nut cap or protector cone 157a with the lower end of the bottom housing section. The force with which the detent mechanism tends to hold the valve member against upward movement is greatly decreased when the shoulders 107a of the bosses 105a of the valve member move out of engagement with the internal shoulder 108a of the stem 148a. The upward movement of the valve member then accelerates and the valve closes with a snap action. Once the valve is in its closed position, it can be opened only by increasing the pressure in the passage 140a of the top housing section.

When the valve member is in the normal open position illustrated in FIGURE 6 the effective orifice of the passages 136a is sufficiently large to allow flow of well fluids through these slots into the passage 140a and through the locking mandrel to the string of tubing above the locking mandrel at normal and desired rates and without effect on the valve member 141a. It is sometimes necessary or desirable that solid substances be pumped downwardly through the tubing and the valve into the well, such as pellets of calcium carbonate, which operation is sometimes termed "gravel packing" and is employed for the purpose of excluding sand from the bore of the tubing or to filter such sand from the well fluids flowing upwardly through the tubing and valve. In this operation the pressure in the string of tubing and therefore in the flow passage 140a of the top housing section is increased by pumping fluid into the upper end of the tubing to such value that the pumped fluids flow through the valve at such high velocity that the pressure differential existing across the valve member causes the valve member 141a and the valve rod 150a to be moved downwardly against the resistance of the spring 132, and to a very negligible degree of the force exerted by the charge of gas in the charge chamber 169a. The downward movement of the valve member relative to the valve rod is limited by the engagement of its annular internal shoulder 116 with the top end shoulder or surface 117 of the bellows rod. The downward movement of the valve member and the bellows rod is limited by the engagement of the shoulder 146a of the head with the shoulder 147a of the bottom housing section. The arcuate seat surface 143a of the head of the valve member is now spaced a substantial distance below the seat surface 144a of the top housing so a larger opening between the valve head and the top housing section is provided through which such solid substances may now be more easily pumped through the valve.

It will now be seen that in each of the valves embodying the invention, a valve member in a housing is movable upwardly to its closed position from its lower open position, that a detent mechanism releasably holds the valve member against upward movement towards its closed position until the pressure exteriorly of the housing drops below a predetermined value whereupon, as result of the charge in the expansible and contractible charge chamber of the valve, the valve member moves upwardly in the housing and the detent mechanism releases the valve member for upward movement whereby the valve member then moves with increased velocity to its fully closed position.

It will further be seen that the valve member in each of the valves 20, 100 and 100a is movably telescoped over the upper end of the hollow tubular bellows rod and that the bellows rod, the valve member and the bellows provide a large volume charge chamber for holding a charge of gas under pressure which biases the valve member towards its upper closed position.

It will further be seen that the bellows rod 150a of the valve 100a is capable of limited downward movement against the resistance of a biasing spring 112 whereby, when a downwardly acting pressure differential across the valve member exceeds a predetermined value, the valve member and valve rod are moved downwardly to a fully open position to enlarge the slots or ports 136a to permit passage of relatively large solid particles or substances through the valve to the exterior thereof.

It will now be seen that each of the valves 200, 20, 100 and 100a includes a housing having top and bottom tubular sections releasably secured to one another and providing lateral slots or ports which open to the flow passage of the top section, valve means mounted for longitudinal movement in the bottom housing section and engageable with a seat surface on the top housing section for closing the lower end of the passage of the top housing section and thus preventing flow between the passage and the housing ports, and an operator means or assembly for the valve means mounted in the bottom housing section which comprises a bellows and a bellows rod which extends through the bellows, the bellows being biased toward expanded position wherein the valve means closes the passage of the top section by a charge of gas under pressure in a charge chamber of the valve and being exposed to pressure from the exterior of the housing which biases the bellows toward contracted position wherein the detent assembly holds the valve in open position.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A pressure charge operated safety valve including: a housing having a longitudinal bore therein with an annular seat surrounding said bore intermediate the ends thereof; said housing having lateral fluid flow inlet means adjacent said seat communicating the exterior of said housing with said bore below and adjacent said seat; valve means movable longitudinally in said housing bore below said seat and having an annular seat surface thereon engageable with said annular seat of said housing to close off flow through said bore of said housing from said fluid flow inlet means to said passage beyond said seat; means in said housing bore operatively connected with said valve means providing an expansible and contractible pressure charge chamber for a charge of expansible fluid under pressure for biasing said valve means toward closed position in which the seat surface of said valve means engages said seat of said housing to close off flow therethrough; said expansible chamber being disposed in said housing bore below said flow inlet means, said pressure chamber having a cross-sectional area exposed to fluid pressure from exteriorly of said housing of lesser area than the area of the seat surface of the valve means and valve seat, whereby fluid pressure acting on said valve means from exteriorly of said housing through said flow inlet means positively retains said valve means in seated closed position on said seat of said housing when said valve is closed; means providing access for fluid pressure from exteriorly of said housing to said bore of said housing below said valve means to act on said valve means; yieldable restraining means operatively associated with said valve means and said housing restraining said valve means in open position against movement toward closed position and releasable upon a predetermined movement of said valve means toward closed position by said pressure charge in said pressure charge chamber; said valve means being moved toward closed position by the charge of pressure in said expansible and contractible charge chamber when said fluid pressure exteriorly of the housing is reduced a predetermined amount below the pressure of the charge in said chamber and the force exerted on the valve by said restraining means limiting movement thereof; said pressure exteriorly of the housing acting on the larger area of the valve means to maintain the valve means closed.

2. A pressure charge operated safety valve of the character set forth in claim 1 wherein: an elongate guide and support rod is operatively connected with said housing and with said valve means and is disposed within said expansible and contractible charge chamber to support the same and engageable with said housing and said valve means to guide said valve means in its longitudinal movement into engagement with said seat in said housing, said rod having at least a portion which is tubular to provide an enlarged chamber within said expansible and contractible pressure charge chamber for the pressure charge confined therein.

3. A safety valve of the character set forth in claim 1 wherein: said expansible and contractible pressure charge chamber includes an elongate longitudinally contractible and expansible pressure charge chamber operatively connected at one end with said housing and with said valve means at the opposite end and providing a confining closure between said valve means and said housing during movement of said valve means between open and closed positions.

4. A safety valve of the character set forth in claim 1 wherein: said restraining means is disposed within said expansible and contractible pressure charge chamber to be protected from the flow stream exteriorly thereof.

5. A pressure charge operative safety valve of the character set forth in claim 1 wherein: means is provided resiliently supporting said valve member and said expansible and contractible pressure charge chamber in engagement with said restraining means and yieldable to permit movement of said valve member and pressure charge chamber further away from said seat in said housing to permit flow of fluids downwardly through said seat in greater volume.

6. A device of the character set forth in claim 1 wherein: said restraining means comprises resilient collet strips on said guide rod provided with external bosses engageable in an internal annular recess provided in said valve means from which said bosses are releasable upon application of a longitudinal force by said pressure charge moving said bosses out of said recess.

7. A device of the character set forth in claim 1 wherein: said housing is provided with stop means for limiting downward movement of said valve means in said bore of said housing at a point spaced sufficiently below the seat in said bore to provide unrestricted flow through the lateral fluid flow inlet opening of said housing, whereby said valve is closed only by the pressure charge in said expansible and contractible pressure charge chamber acting on said valve means when the pressure of the fluids flowing through the inlet opening decreases to a predetermined value below the pressure of said charge in said chamber.

8. A valve of the character set for in claim 1 wherein: the fluid pressure from exteriorly of the housing entering the portion of the bore of the housing below the lateral fluid flow inlet means acts on said expansible and contractible chambers to bias said chamber toward contracted position wherein said valve means is held in said lower open position in said housing.

9. A device of the character set forth in claim 1 wherein the means restraining movement of said valve means toward closed position comprises: detent means in said housing operatively engageable with said housing and said valve means and exerting a biasing force on said valve means tending to hold said valve means in said lower open position until said valve means has moved upwardly a predetermined distance from such lower open position toward closed position.

10. A device of the character set forth in claim 1 wherein: said restraining means is disposed within said expansible and contractible pressure charge chamber and separated from the fluid exteriorly of the chamber.

11. A pressure charge operated safety valve including: a housing having a longitudinal bore therein with an annular seat surrounding said bore intermediate the ends thereof; said housing having lateral fluid flow inlet openings adjacent said seat communicating the exterior of said housing with said bore below and adjacent said seat; valve means movable longitudinally in said housing bore below said seat and having an annular seat surface thereon engageable with said annular seat of said housing to close off flow through said bore of said housing from said fluid flow inlet openings to said passage beyond said seat; operator means in said housing bore operatively connected with said valve means for moving the same and including an elongate longitudinally expansible and contractible bellows operatively connected with said valve means and with said housing and forming therewith a pressure charge chamber for confining a charge of expansible fluid under pressure in said pressure charge chamber for biasing said valve means toward closed position in which the seat surface of said valve means engages said seat of said housing to close off fluid flow therethrough; said bellows being disposed in said housing bore below said flow inlet means, said bellows pressure charge chamber having a lesser cross-sectional area exposed to fluid pressure from exteriorly of said housing than the area of the seat surface of the valve means and valve seat, whereby fluid pressure acting on said valve means from exteriorly of said housing through said flow inlet openings positively retains said valve means in seated closed position on said seat of said housing when said valve is closed; means providing access for fluid pressure from exteriorly of said housing to said bore of said housing below said valve means to act on said bellows and said valve means; yieldable restraining means operatively associated with said valve means and said housing restraining said valve means in open position against movement toward closed position and releasable upon a predetermined movement of said valve means toward closed position by said pressure charge in said pressure charge chamber; said valve means being moved toward closed position by the charge of pressure in said bellows pressure charge chamber when said fluid pressure exteriorly of the housing is reduced a predetermined amount below the pressure of the charge in said bellows pressure charge chamber and the force exerted on the valve by said restraining means limiting movement thereof; said pressure exteriorly of the housing acting on larger area of the valve means to maintain the valve means closed.

12. A pressure charge operated safety valve of the character set forth in claim 11 wherein: an elongate guide and support rod is operatively connected with said housing and with said valve means and is disposed within said bellows charge chamber to support the same and engageable with said housing and said valve means to guide said valve means in its longitudinal movements into engagement with said seat in said housing, said rod having at least a portion which is tubular to provide an enlarged chamber within said bellows pressure charge chamber for the pressure charge confined therein.

13. A safety valve of the character set forth in claim 11 wherein: said bellows of said pressure charge chamber includes a plurality of elongate longitudinally contractible and expansible bellows members joined end-to-end and operatively connected at one end with said housing and with said valve means at the opposite end and providing a confining closure between said valve means and said housing during movement of said valve means between open and closed positions.

14. A safety valve of the character set forth in claim 11 wherein: said restraining means is disposed within said bellows pressure charge chamber to be protected from the flow stream exteriorly thereof.

15. A pressure charge operative safety valve of the character set forth in claim 11: wherein means is provided resiliently supporting said valve member and said pressure charge chamber in engagement with said restraining means and yieldable to permit movement of said valve member and pressure charge chamber further away from said seat in said housing to permit flow of fluids downwardly through said seat in greater volume.

16. A device of the character set forth in claim 11 wherein: said restraining means comprises resilient collet strips on said guide rod provided with external bosses engageable in an internal annular recess provided in said valve means from which said bosses are releasable upon application of a longitudinal force by said pressure charge moving said valve member longitudinally toward closed position to move said bosses out of said recess.

17. A device of the character set forth in claim 11 wherein: said housing is provided with stop means for limiting downward movement of said valve means in said bore of said housing at a point spaced sufficiently below the seat in said bore to provide unrestricted flow through the lateral fluid flow inlet opening of said housing, whereby said valve is closed only by the pressure charge in said bellows pressure charge chamber acting on said valve means when the pressure of the fluids flowing through the inlet opening decreases to a predetermined value below the pressure of said charge in said chamber.

18. A valve of the character set forth in claim 11 wherein: the fluid pressure from exteriorly of the housing entering the portion of the bore of the housing below the lateral fluid flow inlet means acts on the exterior of said bellows pressure charge chamber to bias said bellows toward contracted position wherein said valve means is held in said lower open position in said housing.

19. A device of the character set forth in claim 11 wherein the means restraining movement of said valve means toward closed position comprises: detent means in said bellows pressure charge chamber operatively connected with said housing and said valve means and exerting a biasing force on said valve means tending to hold said valve means in said lower open position until said valve means has moved upwardly a predetermined distance from such lower open position toward closed position.

References Cited

UNITED STATES PATENTS

| | | | |
|---|---|---|---|
| 2,730,269 | 1/1956 | Earle | 137—505.18 XR |
| 2,748,792 | 6/1956 | Davis | 137—155 |
| 2,914,078 | 11/1959 | McGowen | 137—155 |
| 3,124,151 | 3/1964 | Lilly | 137—155 |
| 3,175,514 | 3/1965 | McMurry | 137—155 |

HAROLD W. WEAKLEY, *Primary Examiner.*

U.S. Cl. X.R.

137—510, 529